Figure 1:
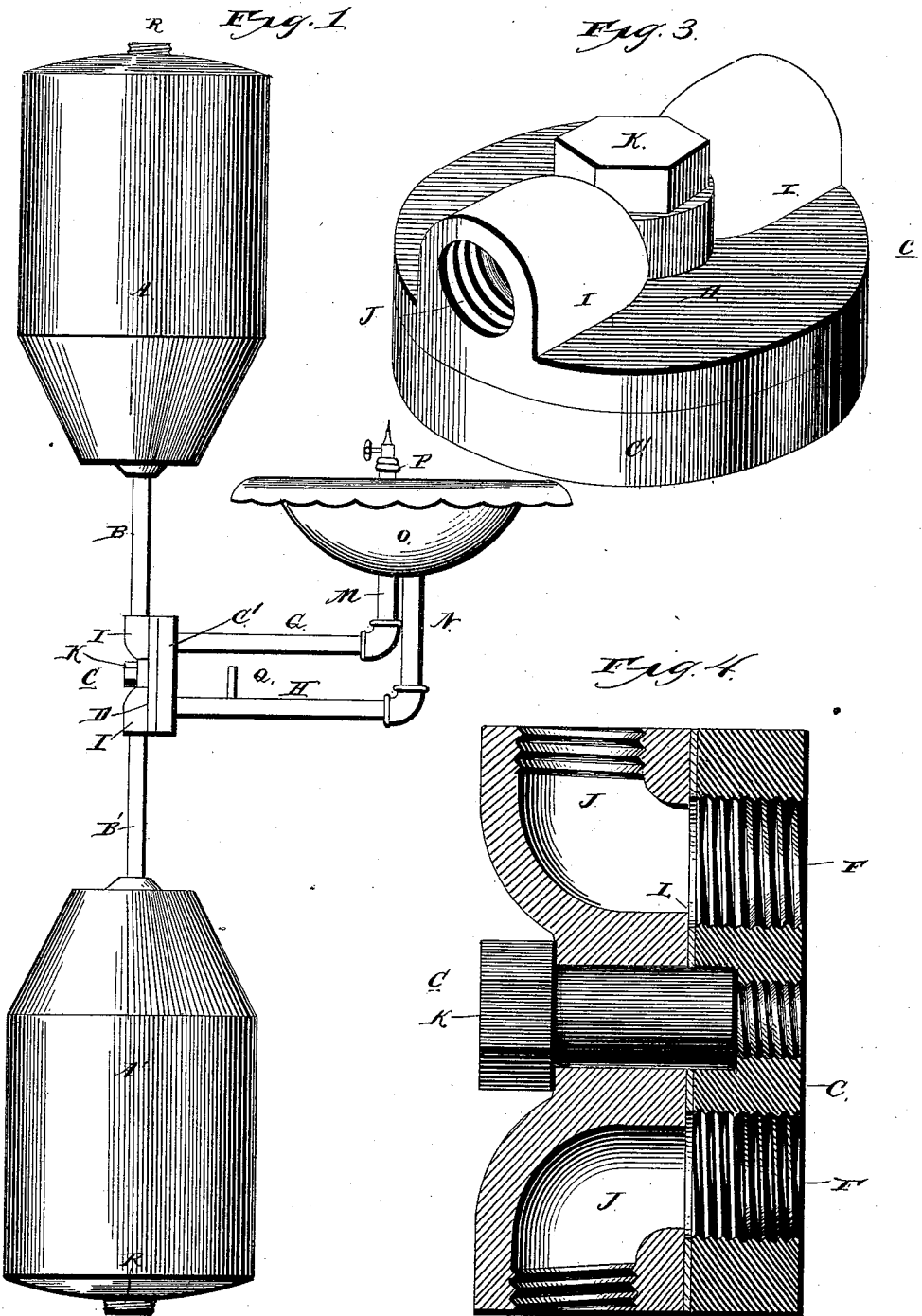

(No Model.) 2 Sheets—Sheet 1.

J. W. PIERSON.
TANK FOUNTAIN.

No. 405,271. Patented June 18, 1889.

Witnesses
Geo. W. Thorpe
R. W. Bishop

Inventor,
John W. Pierson
By his Attorneys.

(No Model.) 2 Sheets—Sheet 2.
J. W. PIERSON.
TANK FOUNTAIN.
No. 405,271. Patented June 18, 1889.
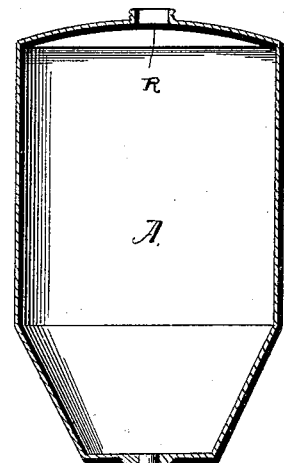
Fig. 2.
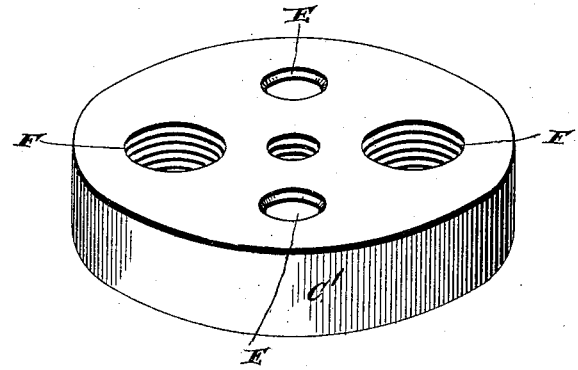
Fig. 6.
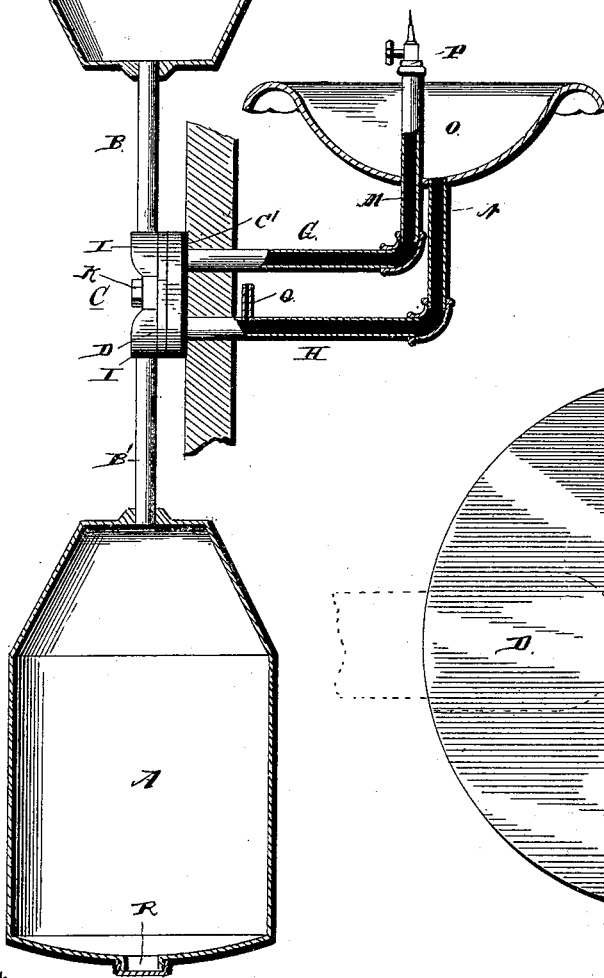
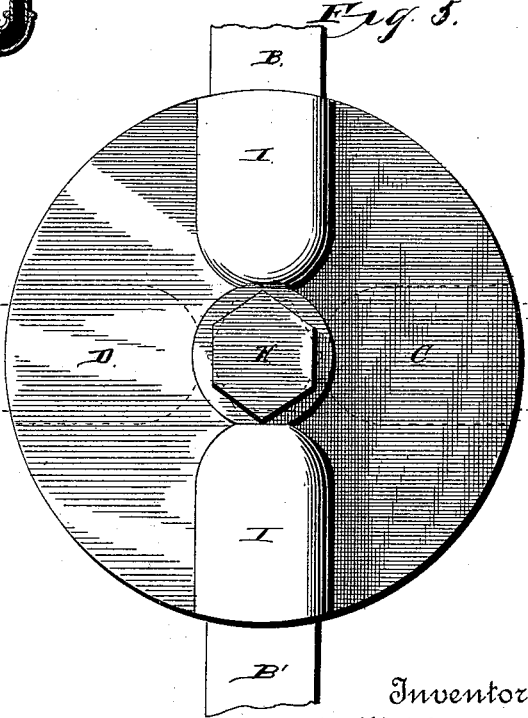
Fig. 5.
Witnesses
Geo. Y. Thorpe
R. W. Bishop.
Inventor
John W. Pierson,
By his Attorneys
C. A. Snow & Co.

UNITED STATES PATENT OFFICE.

JOHN W. PIERSON, OF ST. AUBERT, MISSOURI, ASSIGNOR OF ONE-HALF TO JAMES A. DICKINSON, OF SAME PLACE.

TANK-FOUNTAIN.

SPECIFICATION forming part of Letters Patent No. 405,271, dated June 18, 1889.

Application filed May 28, 1888. Serial No. 275,394. (No model.)

*To all whom it may concern:*

Be it known that I, JOHN W. PIERSON, a citizen of the United States, residing at St. Aubert, in the county of Callaway and State of Missouri, have invented certain new and useful Improvements in Fountains, of which the following is a specification.

My invention is a reversible automatic fountain; and it consists in certain novel features hereinafter described and claimed.

In the accompanying drawings, which fully illustrate my invention, Figure 1 is a side view of a fountain embodying my improvements. Fig. 2 is a vertical sectional view of the same. Fig. 3 is a detail perspective view of the coupling. Fig. 4 is a diametrical section of the valve. Fig. 5 is a front view of the reversible coupling-disk with the ends of the pipes attached thereto, and with dotted lines showing the position of the disk when partly reversed. Fig. 6 is a detail view of the stationary coupling-disk.

Referring to the drawings by letter, A A' designate two similar tanks of any suitable shape or capacity, and B B' designate pipes leading from the lower side of the upper tank and the upper side of the lower tank, respectively, as shown.

C designates the coupling to which the lower end of the pipe B and the upper end of the pipe B' are secured. The said coupling consists of a stationary disk C' and a rotary disk D, as shown. The stationary disk is provided with countersunk transverse openings E, through which screws are passed into a suitable supporting-frame to secure the fountain thereto. The disk is further provided with the transverse openings F, in which the ends of the horizontal pipes G H are secured. The rotary disk is provided on its outer face with the radial lugs I I, having internal L-shaped passages J, as shown. The ends of the shorter branches of these passages register with the openings F in the stationary disk, while the ends of the longer branches thereof receive the ends of the pipes B B'.

K designates a pivotal securing-bolt, which is inserted transversely through the center of the rotary disk, and has its screw-threaded extremity engaging a central internally-threaded opening in the stationary disk, so that when the said bolt is tightened the two disks will be securely clamped together, and when the bolt is loosened the rotary disk will be free to turn on the bolt. A packing-ring L is arranged between the contiguous faces of the two disks to prevent leakage, as shown.

The pipes G H are provided at their outer ends with the vertical branches M N, respectively, to which a basin O is secured, the upper end of the branch N being flush with the bottom of the basin, while the upper end of the branch M is provided with a nozzle P, which projects somewhat above the basin, as clearly shown.

The pipe H is provided with a small vertical stem Q for the escape of the air forced from the lower tank by the descending water, and the tanks are provided in their larger ends with screw caps or plugs R R, as shown.

In practice the upper tank A is filled with water and the disks securely clamped together. The water passes from the tank through the pipe B and the coupling to the pipe G, from which it escapes to form a spray, as shown, falling into the basin. From the basin the water passes through the pipes H and B' to the lower tank, so that when the upper tank is emptied the lower one will be filled. The pivotal securing-bolt is then loosened, and the rotary disk swung around, so as to reverse the tanks, after which the disks are again clamped together. The tank containing the water will thus be brought to the top, and the fountain will again play. It will thus be seen that I have provided a very simple fountain, in which a limited supply of water can be used for an indefinite period of time. The device is especially adapted for use in flower-gardens and similar places, and its advantages are thought to be obvious.

The screw cap or plug of the upper tank may be temporarily loosened or removed to enable air to enter said tank and let the water flow freely therefrom.

Having thus described my invention, what I claim, and desire to secure by Letters Patent, is—

1. The combination of a fountain-basin, a flat circular stationary coupling-disk having a central bolt-hole and transverse inlet and discharge openings, the inlet and discharge pipes connecting said openings with the basin, a flat circular revoluble coupling-disk having L-shaped or angular passages connecting its inner face with its rim or periphery and adapted to register with the inlet and outlet passages of the stationary coupling-disk, the pivotal bolt connecting the revoluble with the stationary coupling-disk, the radially-extending pipes connected to the openings in the rim of the revoluble coupling-disk, and the tanks at the outer ends of said pipes, substantially as and for the purpose set forth.

2. The combination of a fountain-basin, an inlet-pipe having a nozzle, an outlet-pipe having a vent-tube, a flat circular stationary coupling-disk having transverse openings to which said pipes are connected, a flat circular revoluble coupling-disk having angular or L-shaped passages adapted to register with said openings, radial pipes connected to said passages and carrying the tanks, and the pivotal connecting-bolt, substantially as set forth.

JOHN W. PIERSON.

Witnesses:
JOHN CARNAHAN,
JAS. A. DICKINSON.